US012144448B1

(12) United States Patent
McCollum

(10) Patent No.: US 12,144,448 B1
(45) Date of Patent: Nov. 19, 2024

(54) PARCEL RECEPTACLE ASSEMBLY INSTALLABLE ON A GARAGE DOOR OR OTHER STRUCTURE

(71) Applicant: Douglas McCollum, Gilbert, AZ (US)

(72) Inventor: Douglas McCollum, Gilbert, AZ (US)

( * ) Notice: Subject to any disclaimer, the term of this patent is extended or adjusted under 35 U.S.C. 154(b) by 247 days.

(21) Appl. No.: 17/705,667

(22) Filed: Mar. 28, 2022

Related U.S. Application Data

(60) Provisional application No. 63/169,154, filed on Mar. 31, 2021.

(51) Int. Cl.
*A47G 29/28* (2006.01)
*A47G 29/14* (2006.01)
*A47G 29/20* (2006.01)
*E06B 7/32* (2006.01)

(52) U.S. Cl.
CPC ........... *A47G 29/28* (2013.01); *A47G 29/141* (2013.01); *A47G 29/20* (2013.01); *E06B 7/32* (2013.01)

(58) Field of Classification Search
CPC ...... A47G 29/28; A47G 29/141; A47G 29/22; A47G 29/20; E06B 7/32; E05G 7/00; B65D 7/26; B65D 9/14; B65D 15/24; B65D 21/086
See application file for complete search history.

(56) References Cited

U.S. PATENT DOCUMENTS 952,173 A * 3/1910 Zitko .................... B60N 3/083 220/477
3,985,174 A * 10/1976 Bricker .................... E06B 7/32 160/180
5,029,753 A 7/1991 Hipon et al.
5,368,226 A * 11/1994 Franceschino ..... A47G 29/1223 232/19
5,492,272 A 2/1996 Fewer
7,240,823 B1 7/2007 Saldazar
7,249,705 B2 7/2007 Dudley
9,244,147 B1 1/2016 Soundarajan et al.
9,371,681 B2 6/2016 Tompkins
9,926,737 B2 3/2018 Wanjohi
10,413,106 B1 9/2019 Valeriano et al.
10,512,351 B1 12/2019 Valeriano et al.
10,588,440 B1 3/2020 Kajgana
10,881,233 B1 * 1/2021 Walsh ...................... E06B 7/32
11,085,234 B2 * 8/2021 Hunt ......................... E06B 7/28
(Continued)

*Primary Examiner* — William L Miller

(74) *Attorney, Agent, or Firm* — John Rizvi; John Rizvi, P.A.—The Patent Professor®

(57) ABSTRACT

A parcel receptacle assembly which can be attached to a door or other partition separating an interior and an exterior of an enclosure, to facilitate secure and weatherproof delivery of parcel packages and/or other items from outside the enclosure to inside the enclosure, may include a frame assembly. The frame assembly may be configured for deployment around an opening in the partition, with a frame opening aligning with the opening in the partition. A cover may be movable between a closed position over the frame opening and an open position to expose the frame opening. A parcel receptacle may be attached to the frame assembly at the interior the enclosure, facing the frame opening. The parcel receptacle may receive parcel through the frame opening from outside the enclosure. The door panel may be selectively closed and secured over the frame opening to protect the parcel from environmental damage and/or theft.

20 Claims, 8 Drawing Sheets

(56) References Cited

U.S. PATENT DOCUMENTS

| | | | | |
|---|---|---|---|---|
| 11,399,648 | B2 * | 8/2022 | Lewis | A47G 29/1248 |
| 11,510,517 | B2 * | 11/2022 | McLean | B65D 11/1853 |
| 11,587,382 | B1 * | 2/2023 | Valentine | G07C 9/00896 |
| 11,839,319 | B1 * | 12/2023 | Parr | A47G 29/22 |
| 12,016,478 | B2 * | 6/2024 | Newcomb | E05B 47/0001 |
| 2002/0070269 | A1 | 6/2002 | Rosiello et al. | |
| 2003/0023870 | A1 | 1/2003 | Geros | |
| 2017/0127868 | A1 | 5/2017 | Adewuyi | |
| 2017/0286905 | A1 | 10/2017 | Richardson et al. | |
| 2018/0228310 | A1 * | 8/2018 | Enobakhare | A47G 29/20 |
| 2019/0345758 | A1 * | 11/2019 | Drost | E06B 7/32 |
| 2020/0015616 | A1 * | 1/2020 | Sankaran | A47G 29/124 |
| 2021/0005033 | A1 * | 1/2021 | Roman | G06Q 10/0833 |
| 2021/0059456 | A1 * | 3/2021 | Fontanilla | A47G 29/16 |
| 2021/0079720 | A1 * | 3/2021 | Hunt | E06B 7/28 |
| 2021/0082219 | A1 * | 3/2021 | Kane | G07C 9/00182 |
| 2022/0346583 | A1 * | 11/2022 | Evangelidis | A47G 29/20 |

* cited by examiner

PARCEL RECEPTACLE ASSEMBLY INSTALLABLE ON A GARAGE DOOR OR OTHER STRUCTURE

CROSS-REFERENCE TO RELATED APPLICATION

This application claims the benefit of U.S. Provisional Patent Application No. 63/169,154, filed on Mar. 31, 2021, which is incorporated herein by reference in its entirety.

FIELD OF THE INVENTION

The present invention relates generally to receptacles for parcel packages, and more particularly, to a parcel receptacle assembly which can be attached to a door or other partition or structure to facilitate secure and protected delivery of parcel packages and/or other items from outside of a home, office or other building or enclosure to the inside of the enclosure.

BACKGROUND OF THE INVENTION

In recent years, ecommerce and online shopping have exploded in popularity with use of the Internet. Consequently, parcel distribution and delivery systems have been developed or improved to facilitate massive delivery of parcels. Rather than being stocked for sale at retail locations, parceled products are increasingly being shipped from one or more warehouses or centralized locations directly to homes and businesses. A customer typically orders the selected product online, and a parcel delivery service delivers the product to the customer's house or office building.

Upon their arrival at the home or business, parceled products are typically presented to the customer in person or left on a porch or other entrance outside the home or business, for the customer to retrieve later. However, conventional delivery methods may be problematic in the event that the recipient is not home or available to receive the parcel. Parcels left unattended may be subject to theft or environmental damage. In some cases, parcels may be delivered to the wrong address, in which case returned or undelivered parcels may lead to customer dissatisfaction. If no one is present at the delivery address to receive the parcel, the parcel delivery service may leave a stickered tag or card which provides the intended recipient with the option of scheduling a redelivery or picking up the parcel or package at another location. However, such options may be inconvenient, challenging, or frustrating to the customer.

Due to the drawbacks inherent in conventional parcel delivery methods, customers may attempt to plan orders ahead of time by estimating when the order will be delivered and coordinating the delivery with work or travel schedules. However, it may not always be possible for the customer or other recipient to be available at the home or business to securely receive or retrieve the product. The parcel may thus remain in an unprotected and unsecured location for an extended period of time.

Accordingly, there is need for a solution to at least one of the aforementioned problems. Most particularly, there remains a need for a parcel delivery solution which facilitates secure delivery of parcel packages and/or other items to a home, office or other building or enclosure.

SUMMARY OF THE INVENTION

The present invention is directed to a parcel receptacle assembly which can be attached to a door or other partition to facilitate delivery of parcel packages and/or other items thereinto from outside of a home, office or other building or enclosure to the inside of the enclosure. The parcel receptacle assembly enables secure or theft-proof delivery, and also protects the delivered parcel from weather, wild or stray animals, or other harmful agents which may damage the package if otherwise left outside the enclosure.

In a first implementation of the invention, a parcel receptacle assembly is provided which facilitates secure and weatherproof delivery of items from an outside of an enclosure to an inside of the enclosure. The parcel receptable assembly may include a frame assembly, a movable closure, and a parcel receptacle. A frame opening may extend through the frame assembly. The movable closure may be mountable to the frame assembly and selectively deployable between a closed position over the frame opening and an open position to expose the frame opening. The parcel receptacle mountable to the frame assembly. The parcel receptacle assembly may be configured to adopt a usage configuration in which the frame assembly is mounted to a partition which separates an outside of an enclosure from an inside of the enclosure, with the frame assembly deployed around an opening formed in the partition and with the frame opening aligned with the opening of the partition. In the usage configuration, the parcel receptacle may be mounted to the frame assembly on an interior side of the partition and may be deployed on the inside of the enclosure, the parcel receptacle defining a receptacle access opening in spatial communication an interior space of the parcel receptacle. Also in the usage configuration, the receptacle access opening may be arranged in spatial communication with the frame opening of the frame assembly for receiving at least one parcel in the interior space of the parcel receptacle through the frame opening from outside the enclosure with the movable closure arranged in the open position.

In a second aspect, the parcel receptacle may be collapsible.

In another aspect, the parcel receptacle may be collapsible towards the frame assembly to switch the parcel receptacle assembly from the usage configuration to a collapsed configuration.

In another aspect, the interior space of the parcel receptacle may be visible from outside the parcel receptacle in the usage configuration of the parcel receptacle assembly.

In another aspect, the movable closure may be pivotably mountable to the frame assembly and pivotable between the open and closed positions.

In yet another aspect, the frame assembly may include an interior frame member and an exterior frame member. In the usage configuration of the parcel receptacle assembly, the interior and exterior frame members may be disposed on the interior side of the partition and on an exterior side of the partition, respectively, the exterior side arranged opposite to the interior side.

In another aspect, each of the interior and exterior frame members may define a respective frame member opening. In the usage configuration of the parcel receptacle assembly, the frame member openings of the interior and exterior frame members may provide the frame opening.

In another aspect, the movable closure may be movably carried by the exterior frame member in the usage configuration of the parcel receptacle assembly.

In another aspect, the movable closure may be pivotably attached to the exterior frame member in the usage configuration of the parcel receptacle assembly.

In yet another aspect, the movable closure may be hinged to the exterior frame member at a top edge of the movable closure and may be automatically pivotable from the open position to the closed position due to gravity.

In another aspect, the parcel receptacle may include a rear panel, a pair of spaced-apart side panels and a top panel. In the usage configuration of the parcel receptacle assembly, the rear panel may be spaced apart from the frame assembly on the interior side of the partition, and the side panels and top panel may extend between the rear panel and the frame assembly on the interior side of the partition.

In another aspect, the parcel receptacle may be collapsible towards the frame assembly to switch the parcel receptacle assembly from the usage configuration to a collapsed configuration. The rear panel of the parcel receptacle may be arranged closer to the frame assembly in the collapsed configuration of the parcel receptacle assembly than in the usage configuration of the parcel receptacle assembly.

In another aspect, the rear panel, the side panels, and the top panel of the parcel receptacle may have a caged construction. Each of the rear panel, the side panels and the top panel may include a respective panel frame and a respective plurality of panel members spanning the panel frame.

In yet another aspect, each side panel may be pivotally attached to the rear panel of the parcel receptacle.

In another aspect, each side panel may include a pair of panel portions pivotable relative to each other to collapse each side panel relative to the rear panel.

In another aspect, the top panel may be pivotally attached to the rear panel of the parcel receptacle. In the usage configuration of the parcel receptacle assembly, the top panel may be pivotable from a closed position extending from the rear panel to the frame assembly to an open position forming an opening between the rear panel and the frame assembly allowing access to the interior space of the parcel receptacle.

In another aspect, the top panel may be pivotable over and onto a rear side of the rear panel opposite to the interior space of the parcel receptacle.

In yet another aspect, the parcel receptacle may include an open bottom opposite to the top panel.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The present invention is directed toward a parcel receptacle assembly which can be attached to a door or other partition to facilitate secure and weatherproof delivery of parcel packages and/or other items from outside of a home, office or other building or enclosure to the inside of the enclosure. The illustrations of FIGS. 1-9 depict an illustrative embodiment of the invention, referred to as parcel receptable assembly 100.

Figure 1:
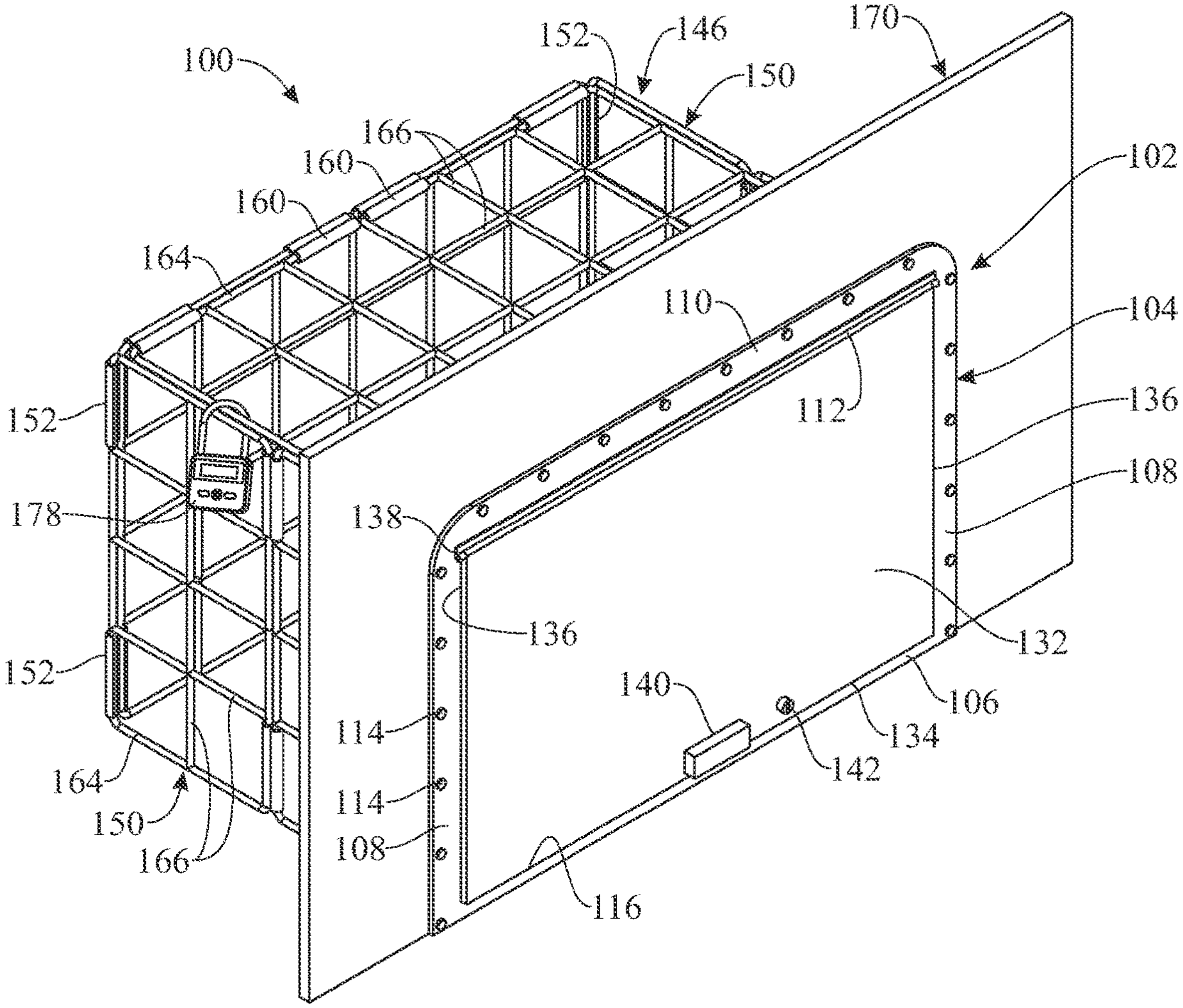
FIG. 1 presents a top front isometric view of a parcel receptacle assembly in accordance with an illustrative embodiment of the present invention, installed in a section of a partition, with the movable closure or door panel of the assembly in the closed position.
Figure 5:
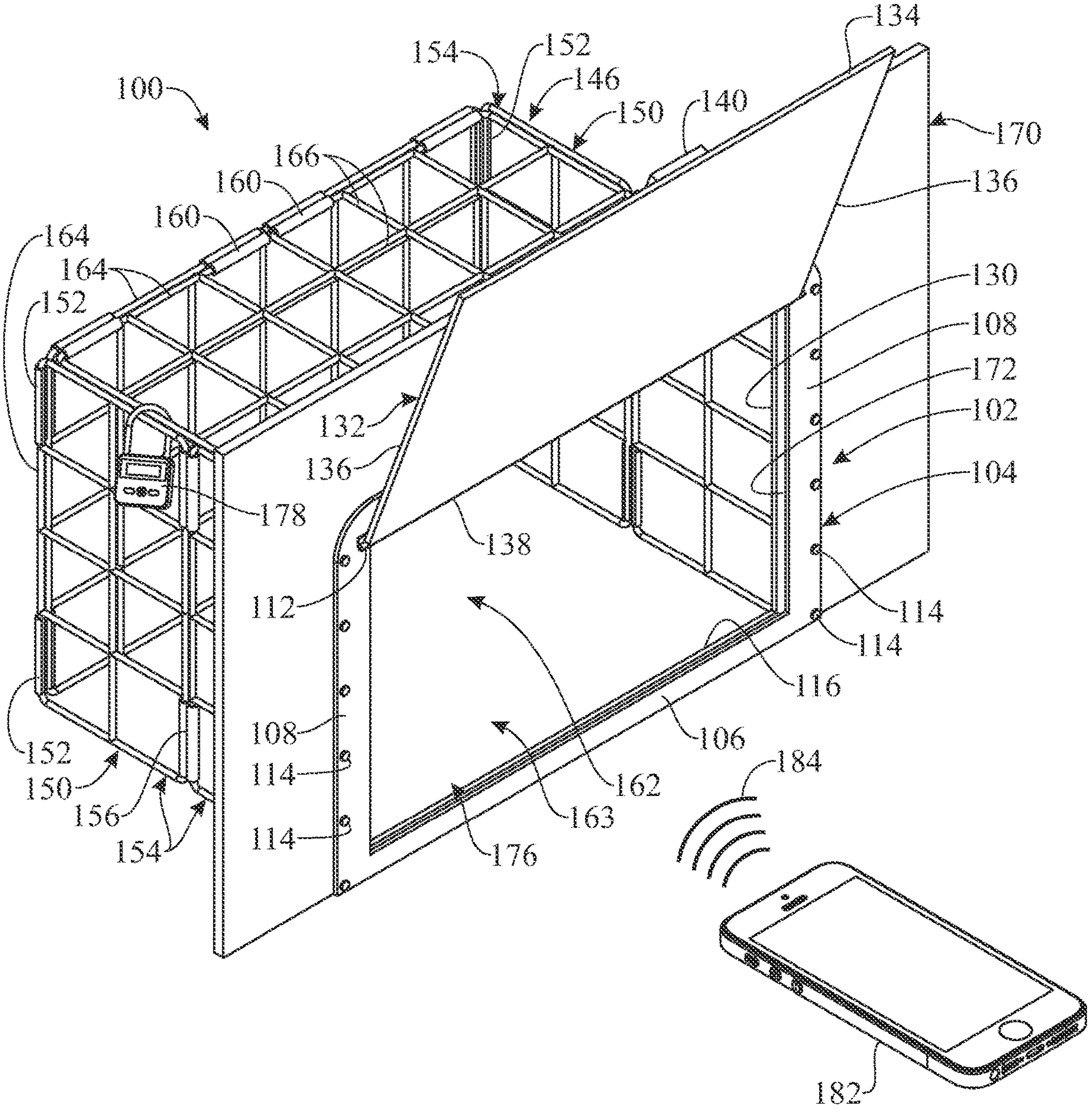
FIG. 5 presents a top front isometric view of the parcel receptacle assembly of FIG. 1, with the door panel in the open position, further illustrating a wireless opening of the door panel using a remote actuating device.

Referring initially to FIG. 1, the parcel receptacle assembly 100 may include a frame assembly 102. The frame assembly 102 may be configured for deployment in an opening 172 (FIG. 3) formed or provided in an exterior structure or partition 170 such as a garage or other door or an exterior wall at a home, business or other building or enclosure. As illustrated in FIG. 5, when the device frame 102 is mounted on the exterior partition 170 about the opening 172, an frame opening 176 may extend through the device frame 102 and the opening 172 in the partition 170.

Figure 3:
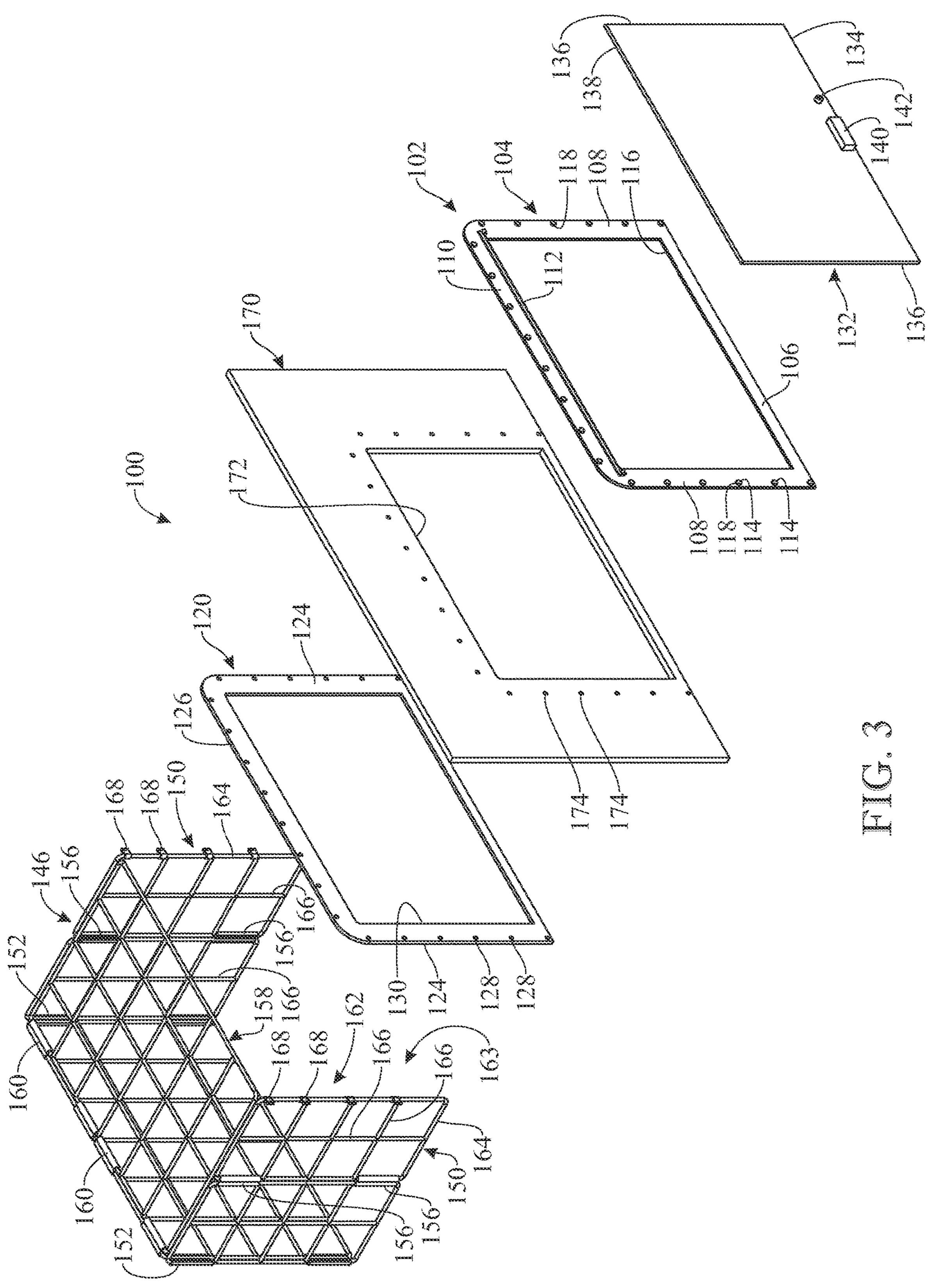
FIG. 3 presents an exploded, top front isometric view of the parcel receptacle assembly of FIG. 1.
Figure 4:
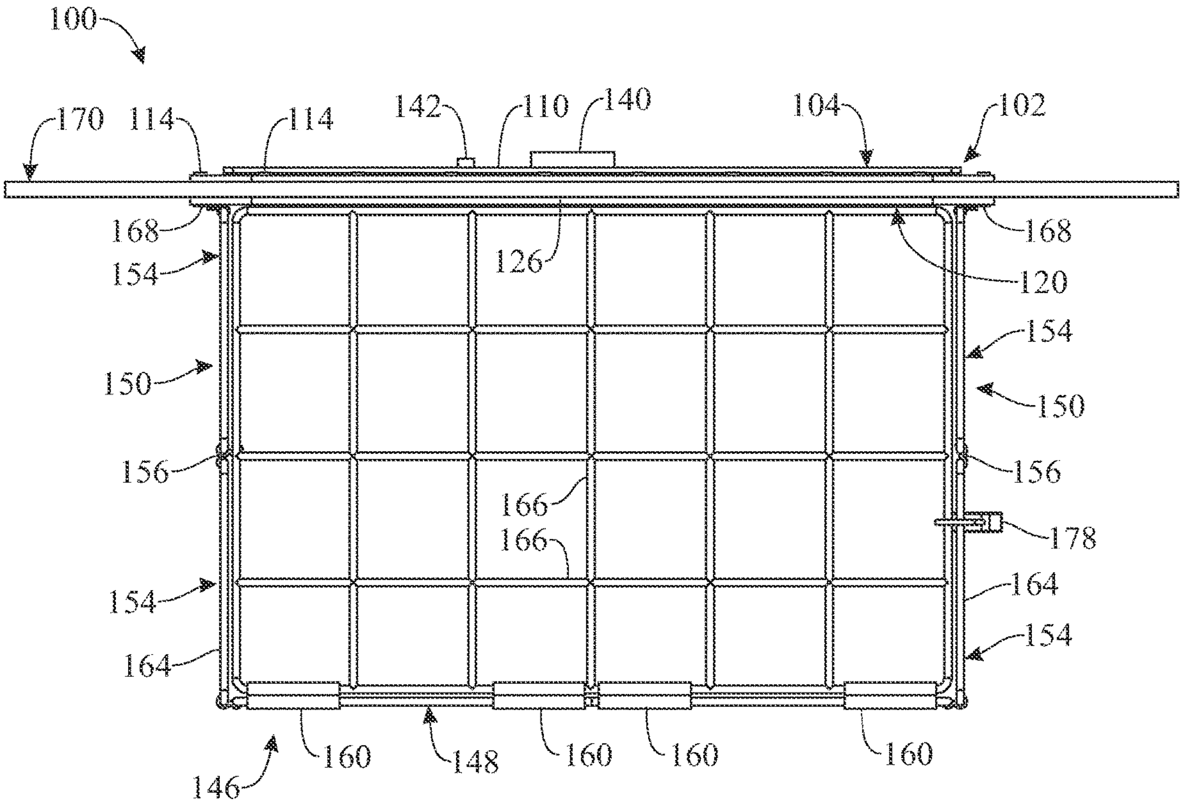
FIG. 4 presents a top plan view of the parcel receptacle assembly of FIG. 1.

As shown in FIGS. 1 and 3, a parcel receptacle 146 having a receptacle interior or interior space 162 (FIG. 3) may be deployable on an inner side of the partition 170, inside the home, business or other enclosure, and in interfacing relationship to the frame opening 176 such that the interior space 162 of the parcel receptacle 146 may receive at least one parcel (not illustrated) through the frame opening 176 from outside the enclosure. A closure, such as, but not limited to, a door panel 132, may be provided at the frame opening 176 and may be selectively deployable in a closed position (FIG. 1) blocking access to the interior space 162 of the parcel receptacle 146 through the frame opening 176, and an open position (FIG. 5) to expose the frame opening 176. The door panel 132 may be selectively closed and secured over the frame opening 176 to protect a parcel located in the interior space 162 from environmental damage and/or theft, for instance and without limitation. Preferably, the door panel 132 or other closure is waterproof, non-see-through (e.g., opaque), and solid (i.e. lacking openings) Also preferably, the door panel 132 or other closure closes into or against the frame assembly 102 in a fluid-tight manner such that water, and preferably also air, does not penetrate the enclosure between the door panel 132 or closure and the frame assembly 102.

As illustrated in FIG. 1, the parcel receptacle system 100 may include a latch 140 configured to secure the door panel 132 in the closed position relative to the frame opening 176 and frame assembly 102. A lock 142 may be operable to facilitate locking the latch 140 in the closed position relative to the frame assembly 102 according to the knowledge of those skilled in the art. In some embodiments, such as the present embodiment, the latch 140 and lock 142 may be provided on the door panel 132; however, alternative embodiments are contemplated in which a latch and a corresponding lock are alternatively or additionally provided in the frame assembly 102.

Figure 7:
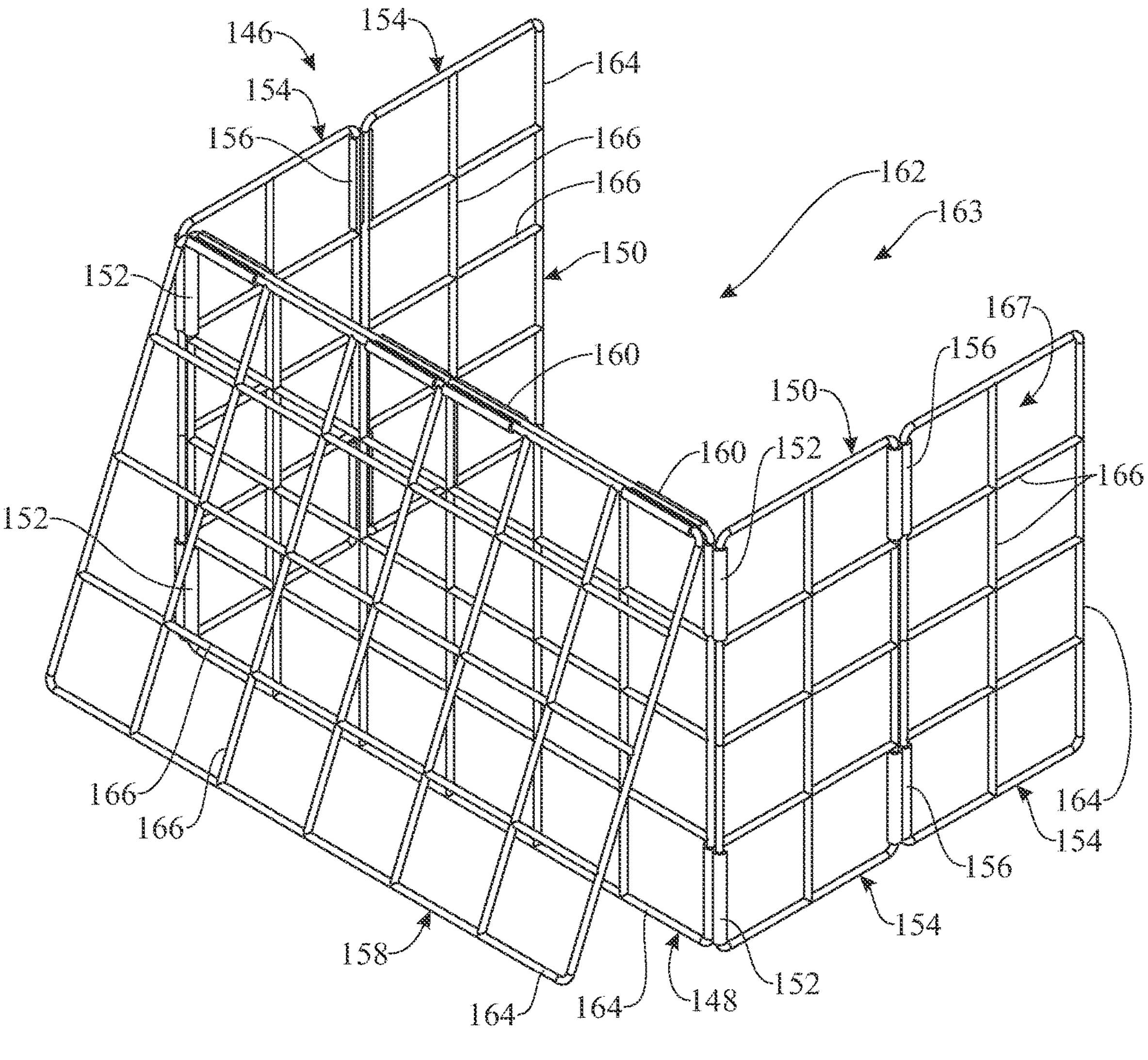
FIG. 7 presents a top rear isometric view of the parcel receptacle of FIG. 6, shown in the parcel-receiving configuration, with the top panel pivoted rearwardly on the rear panel.
Figure 8:
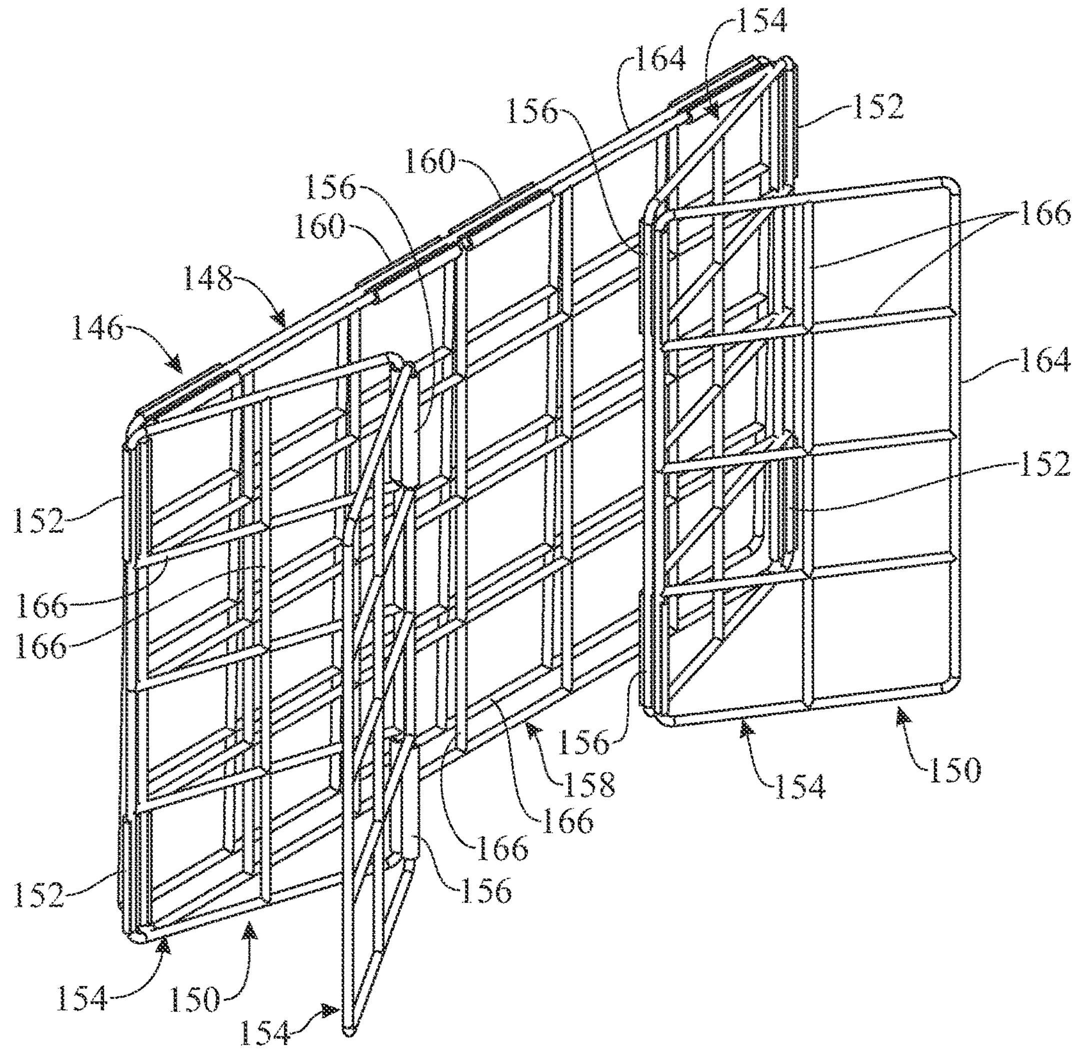
FIG. 8 presents a top front isometric view of the parcel receptacle of FIG. 6, shown collapsed, with the side panels in a partially folded configuration.
Figure 9:
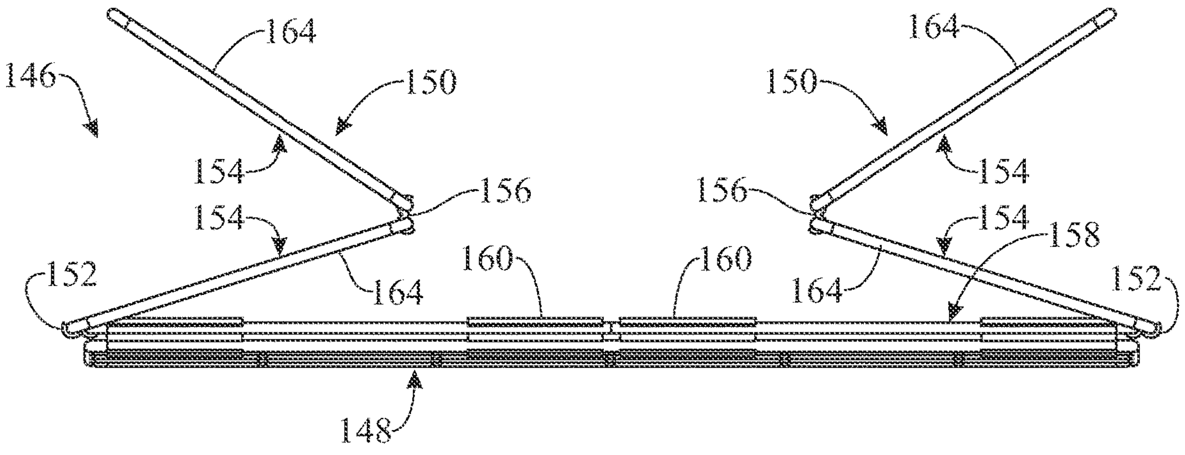
FIG. 9 presents a top plan view of the parcel receptacle illustrated in FIG. 8.

As illustrated in FIGS. 7-9, in some embodiments, the parcel receptacle 146 of the parcel receptacle assembly 100 may be collapsible for purposes that will be hereinafter described. Alternatively or additionally, the parcel receptable 146 may be configured such that interior space 162 of the parcel receptacle 146 is visible from outside the parcel receptacle 146, allowing to view a parcel located in the interior space 162 from outside the parcel receptacle 146. For instance, in some embodiments, such as the present embodiment, the parcel receptacle 146 may include one or more see-through openings or windows; more specifically, the parcel receptacle 146 of the present embodiment is formed as a cage-type enclosure made of elongated members 166 (e.g., wires, bars, or the like) which provides a plurality of see-through spaces 167 between the elongated members 166 through which the interior space 162 is visible.

Figure 2:
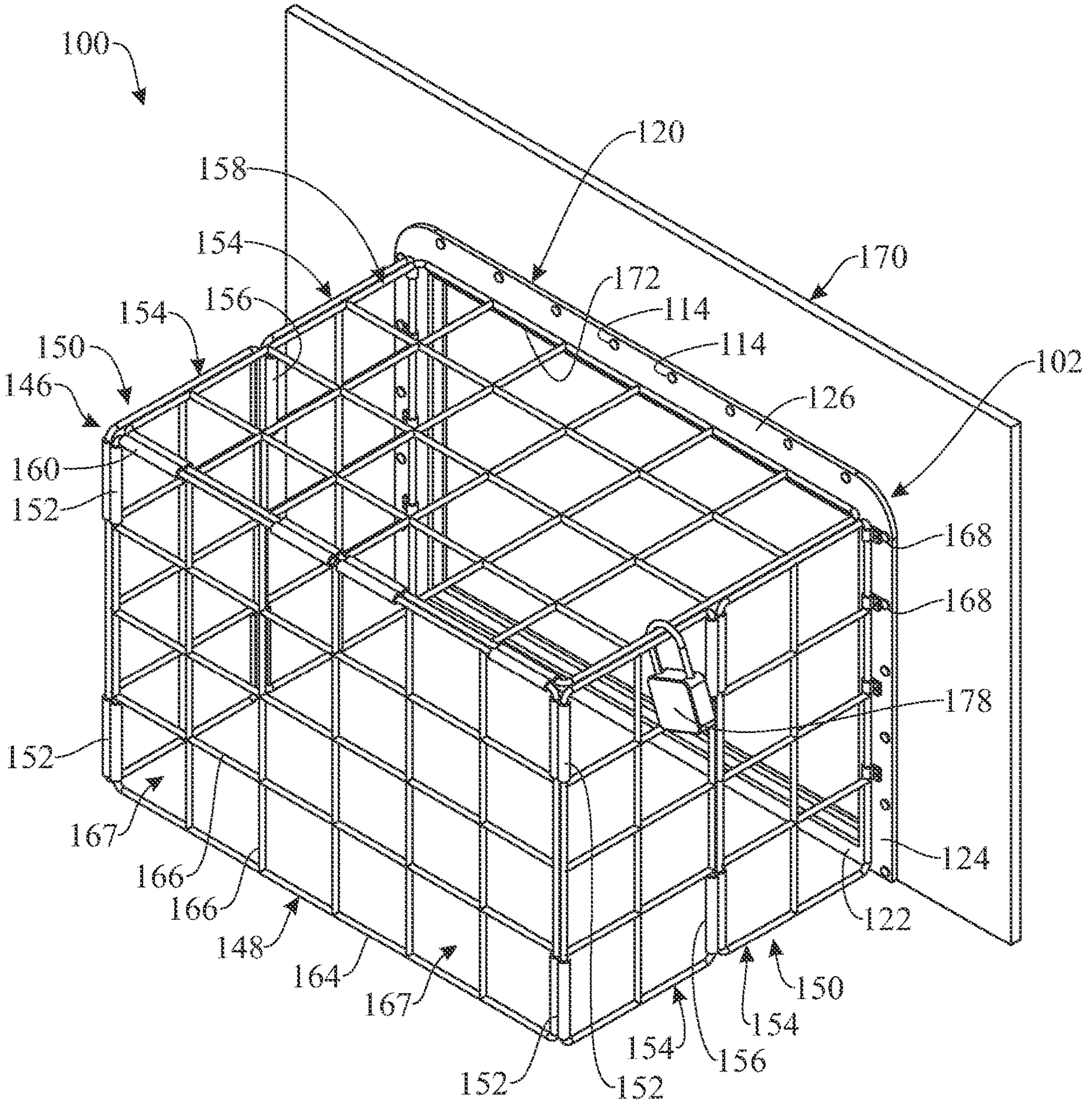
FIG. 2 presents a top rear isometric view of the parcel receptacle assembly illustrated in FIG. 1.

In different embodiments of the invention, the frame assembly and door panel may present varying sizes and/or shapes such as, but not limited to, square, rectangular, round, oval, polygonal, etc. For instance, as shown in FIGS. 1 and 2, the frame assembly 102 and the door panel 132 of the parcel receptacle assembly 100 of the present embodiment is generally elongated and rectangular. The door panel 132 has a bottom panel edge 134, a pair of spaced-apart side panel edges 136 which are parallel to one another and generally perpendicular to the bottom panel edge 134, and a top panel edge 138 that is parallel to the bottom panel edge 134.

With continued reference to FIGS. 1 and 2, the frame assembly 102 may include an exterior frame member 104 disposed on the outer side of the partition 170, shown in FIG. 1, and an interior frame member 120 disposed on the inner side of the partition 170, shown in FIG. 2. As further illustrated in FIG. 3, the exterior frame member 104 of the frame assembly 102 may include a bottom segment 106. A pair of spaced-apart side segments 108 may extend from the bottom segment 106, such as in parallel relationship with one another and perpendicular to the bottom segment 106. A top segment 110 may extend between the side segments 108, such as in parallel, spaced-apart relationship to the bottom segment 106. The bottom, side, and top segments 106, 108 and 110 may define an exterior frame member opening 116, which may be rectangular, as shown. The exterior frame member opening 116 of the exterior frame member 104 may be disposed in registration or alignment with the opening 172 in the partition 170 Similarly, the interior frame member 120 of the frame assembly 102 may include a bottom segment 122. A pair of spaced-apart side segments 124 may extend from the bottom segment 122, such as in parallel relationship with one another and perpendicular to the bottom segment 122. A top segment 126 may extend between the side segments 124 in parallel, spaced-apart relationship to the bottom segment 122. The bottom, side, and top segments 122, 124 and 126 may define an interior frame member opening 130, which may be rectangular, as shown. The interior frame member opening 130 of the interior frame member 120 may be disposed in registration or alignment with the opening 172 in the partition 170 and with the exterior frame member opening 116 in the exterior frame member 104 of the frame assembly 102 when the parcel receptacle assembly 100 is mounted on the partition 170.

The closure (e.g., the door panel 132) may be carried by the frame assembly 102, and movable or separable from the frame assembly 102 to selectively adopt the aforementioned open and closed positions. In preferred embodiments, the door panel 132 or other closure is movably carried by the frame assembly 102 and movable relative to the frame assembly 102 between said open and closed positions. For instance, the door panel 132 or other closure may be hinged to, or slidably attached to, the frame assembly 102, and may pivot, or slide, between the open and closed positions. As a more specific example, the door panel 132 of the present embodiment is specifically attached to the exterior frame member 104 of the frame assembly 102, and at least one hinge 112 is provided on the exterior frame member 104, to pivotably connect the top panel edge 138 of the door panel 132 to the exterior frame member 104 such that the door panel 132 is pivotably and selectively movable between the closed position illustrated in FIG. 1 and the open position illustrated in FIG. 5. In one preferred embodiment, as shown, the at least one hinge 112 may connect the top panel edge 138 of the door panel 132 to the top segment 110 of the exterior frame member 104, such that the door panel 132 is pivotable upward towards the open position and downward towards the closed position.

In some embodiments, the door panel 132 may be at least partially manually operable, and may be configured such that gravity pivots the door panel 132 to the closed position, such as by pivoting downward to the closed position by gravity. Alternative embodiments are contemplated in which operation of the door panel 132 may be at least partially automated. For instance, as illustrated in FIG. 5, in some embodiments, an electrically powered, door motor system (not illustrated) may be provided on the frame assembly 102 and/or on the partition 170. The door motor system may include a wireless receiver, a motor, and a controller, for instance and without limitation. The door motor system may operably engage the door panel 132 to facilitate selective deployment of the door panel 132 between the open and closed positions. A remote actuating device 182 may be configured and operable to emit wireless actuating signals 184 for remote control of the door motor system. The remote actuating device 182 may be a personal electronic device such as a smartphone, for example and without limitation, or may be a dedicated remote control for the door motor system. In some embodiments, the remote actuating device 182 may be operable to unlock the lock 142 and/or unlatch the latch 140, via the wireless actuating signals 184.

In some embodiments, the parcel receptacle 146 of the parcel receptacle assembly 100 may include a plurality of panels which are connected to one another and define the interior space 162 of the parcel receptacle 146. For instance, the parcel receptacle 146 may include a rear panel 148, best shown in FIG. 2, configured to be arranged in spaced-apart, optionally parallel relationship with the partition 170 when the parcel receptacle assembly 100 is installed for use. A pair of spaced-apart side panels 150 and a top panel 158 may extend from the rear panel 148 The side panels 150 may be generally parallel to one another and perpendicular to the rear panel 148, as shown. The interior space 162 of the panel receptacle 146 may be formed by and between the rear panel 148, the side panels 150 and the top panel 158. In some embodiments, such as the present embodiment, the parcel receptacle 146 may lack a front panel, i.e., a front side of the parcel receptacle 146 may be entirely open, as best shown in FIG. 3, with a front opening 163 of the parcel receptacle 146 defined by the top panel 158 and the side panels 148, 150. The open front side of the parcel receptacle 146 is configured to be placed against an inner side of the partition 170, and more preferably, against the interior frame member 120, as will be described in greater detail hereinafter. However, alternative embodiments are contemplated in which the front side of the parcel receptacle 146 may include a front panel extending partially along said front side, such as to provide a smaller front opening 163 of the parcel receptacle 146.

In applications in which the partition 170 is a garage door or other automated door that opens upward, the garage door can function normally with the parcel receptacle assembly 100 attached thereto. As further shown in FIG. 3, in some embodiments, such as the present embodiment, the panel receptacle 146 may lack a bottom panel, i.e. may have an open bottom, such that a parcel deposited into the parcel receptacle 146 rests on the ground immediately below the interior space 162, and is therefore not supported by the parcel receptacle 146. The rear panel 148 and/or side panels 150, and preferably all panels 148 and 150, may extend substantially from (i.e., contacting) or near the ground when the parcel receptacle assembly 100 is installed in the garage door or other partition 170, preventing a person from inserting a hand or tool between a bottom edge of the panels and the ground. Alternative embodiments are contemplated, however, in which the parcel receptacle 146 may include a bottom structure, and the parcel receptacle 146 in the installed position may be arranged with the bottom structure at ground level or elevated from the ground, with the bottom structure supporting the parcel. In non-limiting examples, the bottom structure configured to support the parcel may include a panel, a wall, an impact-dampening member (e.g. a cushion, a foam, a set of elastic bands or cords, a net), etc.

In some embodiments, the rear panel 148, the side panels 150 and the top panel 158 of the parcel receptacle 146 may each have a caged construction, as mentioned heretofore. Each of the rear panel 148, the side panels 150 and the top panel 158 may include a panel frame 164 In the non-limiting example shown in the drawings, each panel frame 164 is generally formed as a square or rectangular frame. The plurality of elongated members 166, described heretofore, may extend across, or span, the panel frame 164. In some embodiments, such as the present embodiment, the elongated members 166 may span the panel frame 164 in intersecting relationship to each other, such as, but not limited to, perpendicularly intersecting relationship. The panel frame 164 and the elongated members 166 of each of the rear panel 148, the side panels 150 and the top panel 158 may be made of metal, plastic, composite and/or other rigid or relatively rigid materials known by those skilled in the art.

Alternative embodiments are contemplated in which one or more of the rear panel 148, the side panels 150 and the top panel 158 of the parcel receptacle 146 may have a generally solid construction. The rear panel 148, the side panels 150 and/or the top panel 158 may be fabricated of a transparent plastic and/or other see-through material, and/or may include at least one see-through opening or window, to enable a user to view the parcel or parcels in the interior space 162 from outside the parcel receptacle 146.

As best shown in FIG. 2, in some embodiments, at least one side panel hinge 152 may pivotally attach each side panel 150 to the rear panel 148 of the parcel receptacle 146. Similarly, at least one top panel hinge 160 may pivotally attach the top panel 158 to the rear panel 148. As further shown in the figure, in some embodiments, each side panel 150 of the parcel receptacle 146 may include, or be divided into, a pair of side panel portions 154. At least one panel portion hinge 156 may pivotally attach the side panel portions 154 of each side panel 150 to each other. The rearmost side panel portion 154 of each side panel 150 is pivotably connected to the rear panel 148 by the aforementioned side panel hinge or hinges 152.

As illustrated in FIGS. 8 and 9, each side panel 150 may be capable of pivoting with respect to the rear panel 148 via the corresponding side panel hinge or hinges 152. The side panel portions 154 of each side panel 150 may be capable of pivoting with respect to each other via each corresponding panel portion hinge or hinges 156 In like manner, as illustrated in FIG. 7, the top panel 158 may be capable of pivoting with respect to the rear panel 148 via the top panel hinge or hinges 160. The parcel receptacle 146 may be selectively configurable in the extended, functional configuration illustrated in FIG. 6 and the collapsed configuration illustrated in FIGS. 8 and 9, in which the top panel 158 has been pivoted rearward, over and onto the rear panel 148, and the side panels 150 have been collapsed, to bring the rear panel 148 closer to the front opening 163 of the parcel receptacle 146 and substantially reduce the overall size of the parcel receptacle 146.

As illustrated in FIGS. 1 and 2, in some applications of the parcel receptacle assembly 100, a securing member 178 (e.g., a lock, chain, strap, clasp, etc.) may be extended between the elongated members 166 of at least one of the side panels 150 and the top panel 158 and engaged to secure the caged parcel receptacle 146 in the extended, functional configuration. The securing member 178 may contribute to prevent unauthorized entry into the garage or other enclosure through the frame opening 176 and the interior space 162 of the parcel receptacle 146.

The frame assembly 102 and the parcel receptacle 146 of the parcel receptacle assembly 100 of the present disclosure is preferably installed on and attached to the partition 170. In some preferred embodiments, such as the present embodiment, the frame assembly 102 may be mounted on the partition 170, and the parcel receptacle 146 may be attached to the frame assembly 102. For instance, as illustrated in FIG. 3, a plurality of frame fasteners 114 may attach the exterior frame member 104 and the interior frame member 120 of the frame assembly 102 to the partition 170 and the parcel receptacle 146. The frame fasteners 114 may extend through respective exterior fastener openings 118 in the exterior frame member 104, partition fastener openings 174 in the partition 170 and interior fastener openings 128 in the interior frame member 120, respectively. A plurality of frame attachment tabs 168 may be provided on each side panel 150 of the parcel receptacle 146. The frame fasteners 114 may be secured to tab openings in the respective frame attachment tabs 168 to attach the parcel receptacle 146 to the partition 170 via the frame assembly 102. For instance and without limitation, the frame fasteners 114 and tab openings in the respective frame attachment tabs 168 may be secured to one another by a threaded connection, a bayonet-type connection, a snap fit, or other applicable connection. Alternative embodiments are contemplated, however, in which the exterior frame member 104 and interior frame member 120, once placed on the partition 170, fasten to one another, such as by a snap fitting between the exterior frame member 104 and the interior frame member 120, without the need to extend fasteners through the partition 170.

In an example of application, the parcel receptacle assembly 100 may be installed in the partition 170 to enable a parcel or relatively small or portable package (not illustrated) to be placed in the interior space 162 of the parcel receptacle 146 and secured therein in a weatherproof and theft-resistant manner. For this purpose, the opening 172 (FIG. 3) may initially be marked and cut in a garage door or other structure or partition 170 which separates an outside area, at which parcel delivery personnel may arrive to deliver a parcel, from an inside space or enclosure (e.g., a garage), at which it is desired to have the parcel placed in accordance with the present disclosure. The opening 172 in the partition 170 may correspond to the size and shape of the exterior frame member opening 116 of the exterior frame member 104 and the interior frame member opening 130 of the interior frame member 120.

Figure 6:
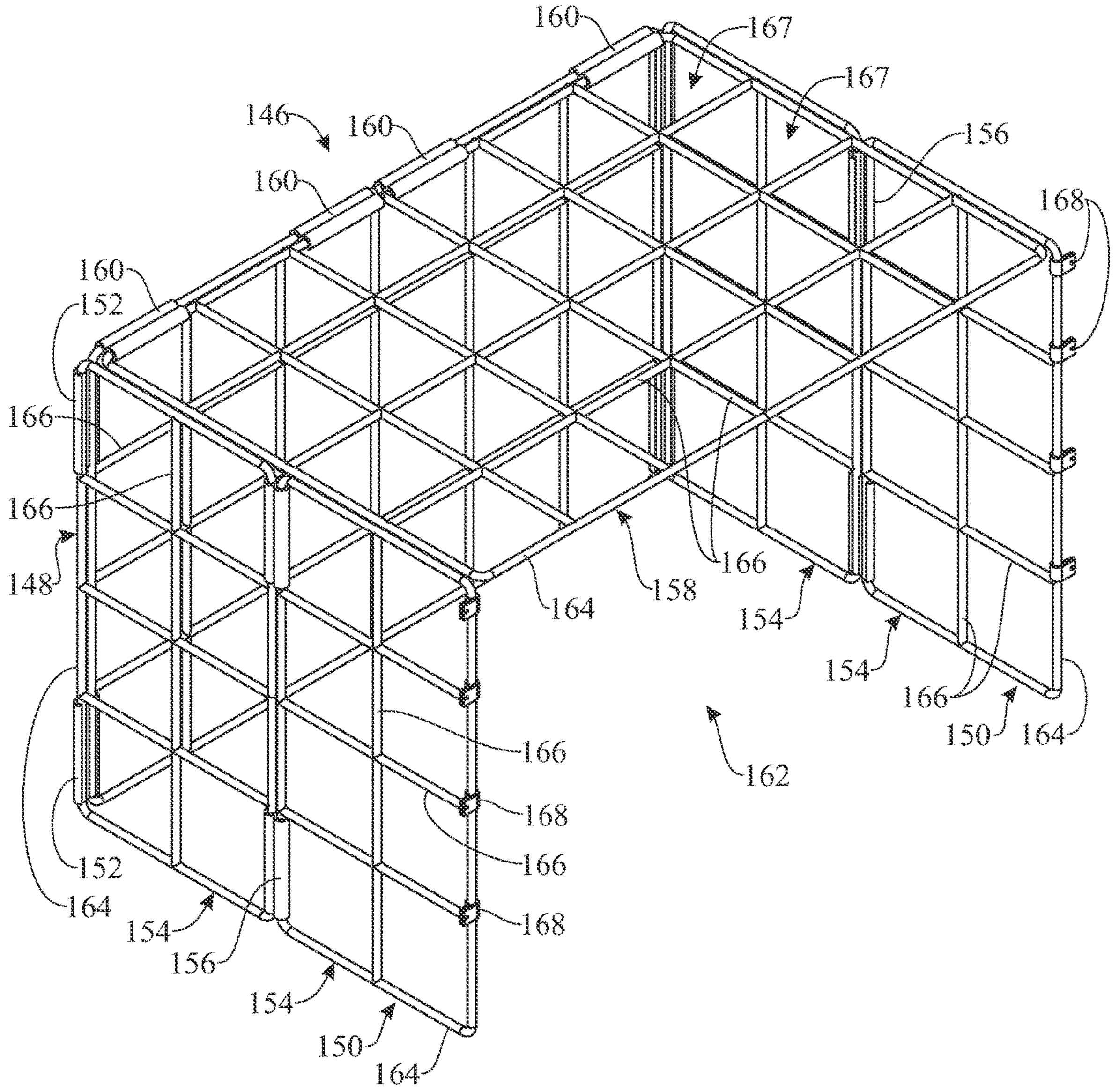
FIG. 6 presents a top front isometric view of the parcel receptacle of the parcel receptacle assembly of FIG. 1, the parcel receptacle shown deployed in an extended, parcel-receiving configuration.

The parcel receptacle 146 may be deployed in the extended, functional configuration illustrated in FIG. 6 by pivoting the side panels 150 with respect to the rear panel 148 via the side panel hinges 152 and the side panel portions 154 with respect to each other via the panel portion hinges 156. The top panel 158 may be pivoted with respect to the rear panel 148 via the top panel hinges 160 and rested on top of the extended side panels 150 and/or secured to the extended side panels 150 such that the top panel 158 remains in the deployed or elevated position shown in FIGS. 1 and 2, in which the top panel 158 covers the interior space 162 of the parcel receptacle 146. Once the top panel 158 is arranged over the interior space 162, the securing member 178 may be deployed and engaged to block a pivoting of the top panel 158 relative to the remaining panels and thus prevent unauthorized entry into the garage or other enclosure through the frame opening 176. In some embodiments, the securing member 178 may also contribute to maintain the parcel receptacle 146 in this extended or non-collapsed configuration.

The frame assembly 102 may be assembled and attached to the partition 170 and the parcel receptacle 146 attached to the frame assembly 102, such as by deploying the frame fasteners 114, as was heretofore described with respect to FIG. 3. The door panel 132 may be closed, latched, and locked by engagement of the latch 140 and lock 142.

Upon delivery of a parcel package (not illustrated), delivery personnel may unlock the lock 142 (if the embodiment includes a lock 142 and the lock 142 has been previously locked) and disengage the latch 140, if available. The delivery personnel may deploy the door panel 132 from the closed position (FIG. 1) to the open position (FIG. 5). In some applications, unlocking, unlatching and/or opening the door panel 132 may be carried out manually. In other applications, unlocking, unlatching and/or opening the door panel 132 may be automated and accomplished remotely, via the activating signals 184 using the remote activating device 182, as was heretofore described with respect to FIG. 5. Once the door panel 132 is open, the parcel package may be inserted through the open frame opening 176 into the interior space 162 of the parcel receptacle 146. If the parcel receptacle 146 includes an open bottom, such as with the present embodiment, the package may be placed on the floor of the garage or enclosure interior inside the parcel receptacle 146. If the parcel receptacle 146 includes a bottom panel or other bottom structure, the package may instead be supported thereon. The door panel 132 may then be returned to the closed position. In some embodiments, the door panel 132 may then be latched and locked by deployment of the latch 140 and lock 142.

The intended recipient of the parcel package may view the parcel package in the interior space 162 through the rear panel 148, the side panels 150 and/or the top panel 158 (and more specifically, in the present embodiment, through all of said panels). The recipient may subsequently retrieve the parcel package from outside the partition 170 by unlocking, unlatching, and opening the door panel 132 and removing the parcel package from the interior space 162 of the parcel receptacle 146 through the frame opening 176. Alternatively, the recipient may choose to retrieve the parcel package from inside the partition 170 by, for instance, pivoting the top panel 158 of the parcel receptacle 146 to an open position which allows access to the parcel housed in the interior space 162 of the parcel receptacle 146. It will be appreciated by those skilled in the art that the closed and locked door panel 132 and the parcel receptacle 146 maintain the parcel package in a secured and theft-resistant condition until the recipient of the parcel package retrieves the package.

In situations in which the partition 170 is a garage door, the door can be raised as the parcel receptacle assembly 100 remains attached thereto. Raising of the garage door partition 170 with the parcel receptacle assembly 100 enclosing a parcel may be facilitated by the parcel receptacle 146 having an open bottom; as the garage door partition 170 raises, the parcel may remain on the ground while the garage door partition 170 and parcel receptacle 146 elevate. Upon subsequent lowering of the door, the parcel receptacle 146 may again rest on or adjacent to the floor of the garage in some embodiments. Finally, when not in use, the parcel receptacle 146 may be collapsed as described heretofore to the more compact position shown in FIG. 9, in which the parcel receptacle 146 is collapsed towards the inner side of the partition 170, with the rear panel 148 arranged closer to the inner side of the partition 170 than in the extended or non-collapsed configuration (FIG. 1), while the parcel receptacle 146 remains attached to the partition 170 via the frame assembly 102. With the parcel receptacle 146 in the collapsed position, as the garage door partition 170 is operated normally (i.e. raised and lowered), the collapsed parcel receptacle 146 may remain collapsed against the partition 170 due to gravity.

As can be seen, the parcel receptacle assembly provides an easy-to-use, convenient solution for safely delivering parcel or small packages into a garage or space through a garage door or partition separating the space from the outside. Advantageously, in cases where the partition is a garage door or other elevatable structure, the partition may be elevated and lowered with the parcel receptacle assembly there installed. Furthermore, in preferred embodiments, the parcel receptacle assembly is collapsible, to save space when not in use, and may remain collapsed during elevation and lowering of the partition. Finally, in preferred embodiments, the parcel receptacle assembly is self-contained and forms a kit which can be easily installed onto an existing garage door or partition by carrying out a minimal number of actions or modifications on the partition (mainly, cutting the opening through the partition).

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A parcel receptacle assembly to facilitate secure and weatherproof delivery of items from an outside of an enclosure to an inside of the enclosure, comprising:

a frame assembly, comprising a frame opening extending through the frame assembly;

a movable closure mountable to the frame assembly and selectively deployable between a closed position over the frame opening and an open position to expose the frame opening; and a parcel receptacle mountable to the frame assembly, the parcel receptacle comprising a rear panel, a pair of spaced-apart side panels and a top panel, wherein the rear panel, the side panels and the top panel have a caged construction, wherein each of the rear panel, the side panels and the top panel comprises a respective panel frame and a respective plurality of panel members spanning the panel frame; wherein the parcel receptacle assembly is configured to adopt a usage configuration in which the frame assembly is mounted to a partition which separates the outside of an enclosure from an inside of the enclosure, with the frame assembly deployed around an opening formed in the partition and with the frame opening aligned with the opening of the partition, and in which the parcel receptacle is mounted to the frame assembly on an interior side of the partition and is deployed on the inside of the enclosure, the parcel receptacle defining a receptacle access opening in spatial communication with an interior space of the parcel receptacle, and further in which the receptacle access opening is arranged in spatial communication with the frame opening of the frame assembly for receiving at least one parcel in the interior space of the parcel receptacle through the frame opening from outside the enclosure with the movable closure arranged in the open position, and further in which the rear panel is spaced apart from the frame assembly on the interior side of the partition, and the side panels and top panel extend between the rear panel and the frame assembly on the interior side of the partition.

2. The parcel receptacle assembly of claim 1, wherein the parcel receptacle is collapsible.

3. The parcel receptacle assembly of claim 2, wherein the parcel receptacle is collapsible towards the frame assembly to switch the parcel receptacle assembly from the usage configuration to a collapsed configuration.

4. The parcel receptacle assembly of claim 3, wherein the rear panel of the parcel receptacle is arranged closer to the frame assembly in the collapsed configuration of the parcel receptacle assembly than in the usage configuration of the parcel receptacle assembly.

5. The parcel receptacle assembly of claim 1, wherein the interior space of the parcel receptacle is visible from outside the parcel receptacle in the usage configuration of the parcel receptacle assembly.

6. The parcel receptacle assembly of claim 1, wherein the movable closure is pivotably mountable to the frame assembly and pivotable between the open and closed positions.

7. The parcel receptacle assembly of claim 1, wherein the frame assembly comprises an interior frame member and an exterior frame member, wherein, in the usage configuration of the parcel receptacle assembly, the interior and exterior frame members are disposed on the interior side of the partition and on an exterior side of the partition, respectively, the exterior side arranged opposite to the interior side.

8. The parcel receptacle assembly of claim 7, wherein each of the interior and exterior frame members defines a respective frame member opening, wherein, in the usage configuration of the parcel receptacle assembly, the frame member openings of the interior and exterior frame members provide the frame opening.

9. The parcel receptacle assembly of claim 7, wherein the movable closure is movably carried by the exterior frame member in the usage configuration of the parcel receptacle assembly.

10. The parcel receptacle assembly of claim 9, wherein the movable closure is pivotably attached to the exterior frame member in the usage configuration of the parcel receptacle assembly.

11. The parcel receptacle assembly of claim 10, wherein the movable closure is hinged to the exterior frame member at a top edge of the movable closure and is automatically pivotable from the open position to the closed position due to gravity.

12. The parcel receptacle assembly of claim 1, wherein each side panel is pivotally attached to the rear panel of the parcel receptacle.

13. The parcel receptacle assembly of claim 12, wherein each side panel comprises a pair of panel portions pivotable relative to each other to collapse said each side panel relative to the rear panel.

14. The parcel receptacle assembly of claim 1, wherein the top panel is pivotally attached to the rear panel of the parcel receptacle, and wherein, in the usage configuration of the parcel receptacle assembly, the top panel is pivotable from a closed position extending from the rear panel to the frame assembly to an open position forming an opening between the rear panel and the frame assembly allowing access to the interior space of the parcel receptacle.

15. The parcel receptacle assembly of claim 14, wherein the top panel is pivotable over and onto a rear side of the rear panel opposite to the interior space of the parcel receptacle.

16. The parcel receptacle assembly of claim 1, wherein the parcel receptacle comprises an open bottom opposite to the top panel.

17. A parcel receptacle assembly to facilitate secure and weatherproof delivery of items from an outside of an enclosure to an inside of the enclosure, comprising:

a frame assembly, comprising a frame opening extending through the frame assembly;

a movable closure mountable to the frame assembly and selectively deployable between a closed position over the frame opening and an open position to expose the frame opening; and a parcel receptacle mountable to the frame assembly, the parcel receptacle comprising a rear panel, a pair of spaced-apart side panels and a top panel, wherein each side panel is pivotally attached to the rear panel; wherein the parcel receptacle assembly is configured to adopt a usage configuration in which the frame assembly is mounted to a partition which separates the outside of an enclosure from an inside of the enclosure, with the frame assembly deployed around an opening formed in the partition and with the frame opening aligned with the opening of the partition, and in which the parcel receptacle is mounted to the frame assembly on an interior side of the partition and is deployed on the inside of the enclosure, the parcel receptacle defining a receptacle access opening in spatial communication with an interior space of the parcel receptacle, and further in which the receptacle access opening is arranged in spatial communication with the frame opening of the frame assembly for receiving at least one parcel in the interior space of the parcel receptacle through the frame opening from outside the enclosure with the movable closure arranged in the open position, and further in which the rear panel is spaced apart from the frame assembly on the interior side of the partition, and the side panels and top panel extend between the rear panel and the frame assembly on the interior side of the partition.

18. The parcel receptacle assembly of claim 17, wherein each side panel comprises a pair of panel portions pivotable relative to each other to collapse said each side panel relative to the rear panel.

19. A parcel receptacle assembly to facilitate secure and weatherproof delivery of items from an outside of an enclosure to an inside of the enclosure, comprising:

a frame assembly, comprising a frame opening extending through the frame assembly;

a movable closure mountable to the frame assembly and selectively deployable between a closed position over the frame opening and an open position to expose the frame opening; and a parcel receptacle mountable to the frame assembly, the parcel receptacle comprising a rear panel, a pair of spaced-apart side panels and a top panel, wherein the top panel is pivotally attached to the rear panel; wherein the parcel receptacle assembly is configured to adopt a usage configuration in which the frame assembly is mounted to a partition which separates the outside of an enclosure from an inside of the enclosure, with the frame assembly deployed around an opening formed in the partition and with the frame opening aligned with the opening of the partition, and in which the parcel receptacle is mounted to the frame assembly on an interior side of the partition and is deployed on the inside of the enclosure, the parcel receptacle defining a receptacle access opening in spatial communication with an interior space of the parcel receptacle, and further in which the receptacle access opening is arranged in spatial communication with the frame opening of the frame assembly for receiving at least one parcel in the interior space of the parcel receptacle through the frame opening from outside the enclosure with the movable closure arranged in the open position, and further in which the rear panel is spaced apart from the frame assembly on the interior side of the partition, and the side panels and top panel extend between the rear panel and the frame assembly on the interior side of the partition, and the top panel is pivotable from a closed position extending from the rear panel to the frame assembly to an open position forming an opening between the rear panel and the frame assembly allowing access to the interior space of the parcel receptacle.

20. The parcel receptacle assembly of claim 19, wherein the top panel is pivotable over and onto a rear side of the rear panel opposite to the interior space of the parcel receptacle.

* * * * *